(No Model.) 7 Sheets—Sheet 1.
R. B. ROBBINS.
CORN OR CANE HARVESTER.
No. 475,418. Patented May 24, 1892.
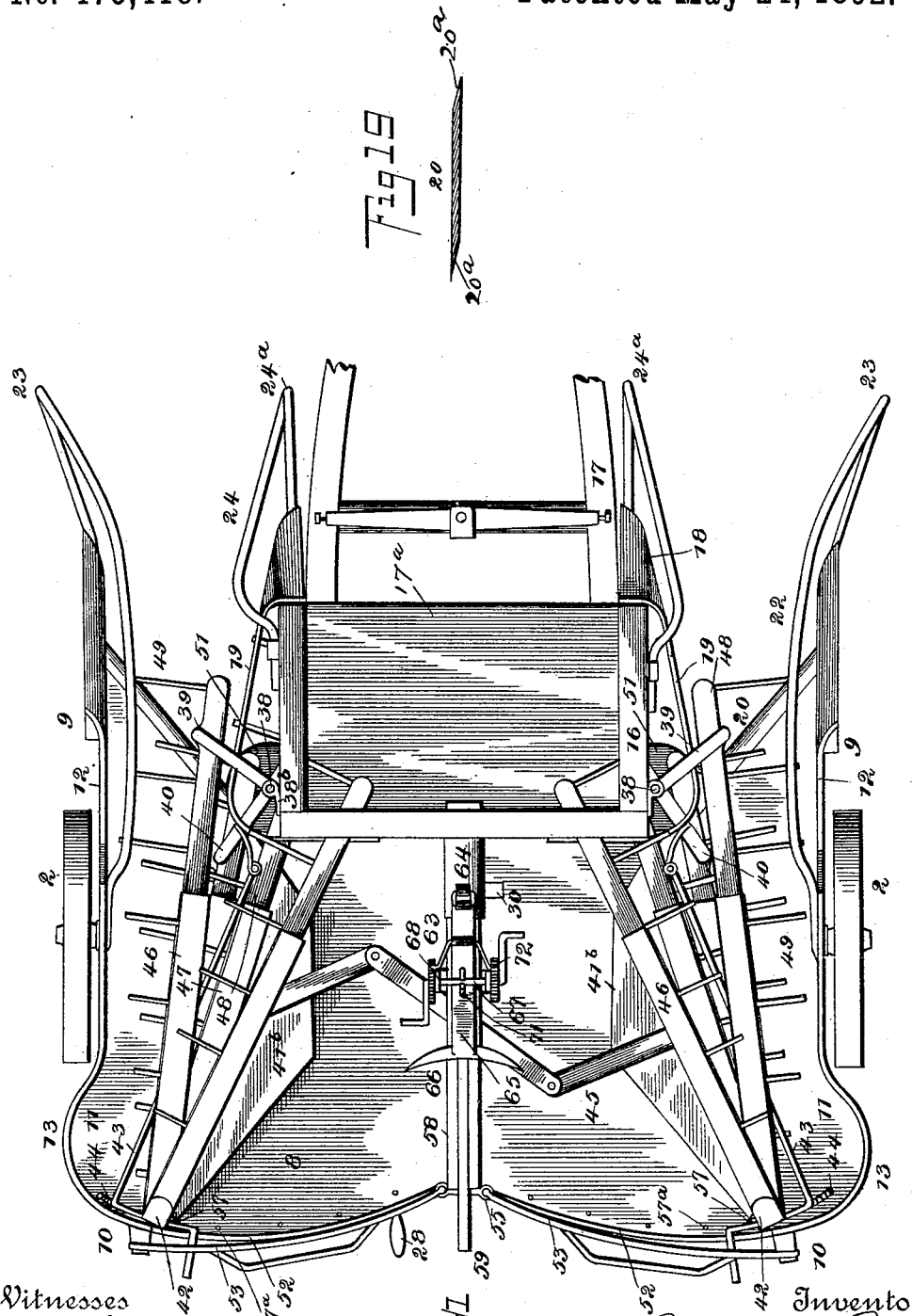

(No Model.) 7 Sheets—Sheet 2.
R. B. ROBBINS.
CORN OR CANE HARVESTER.
No. 475,418. Patented May 24, 1892.
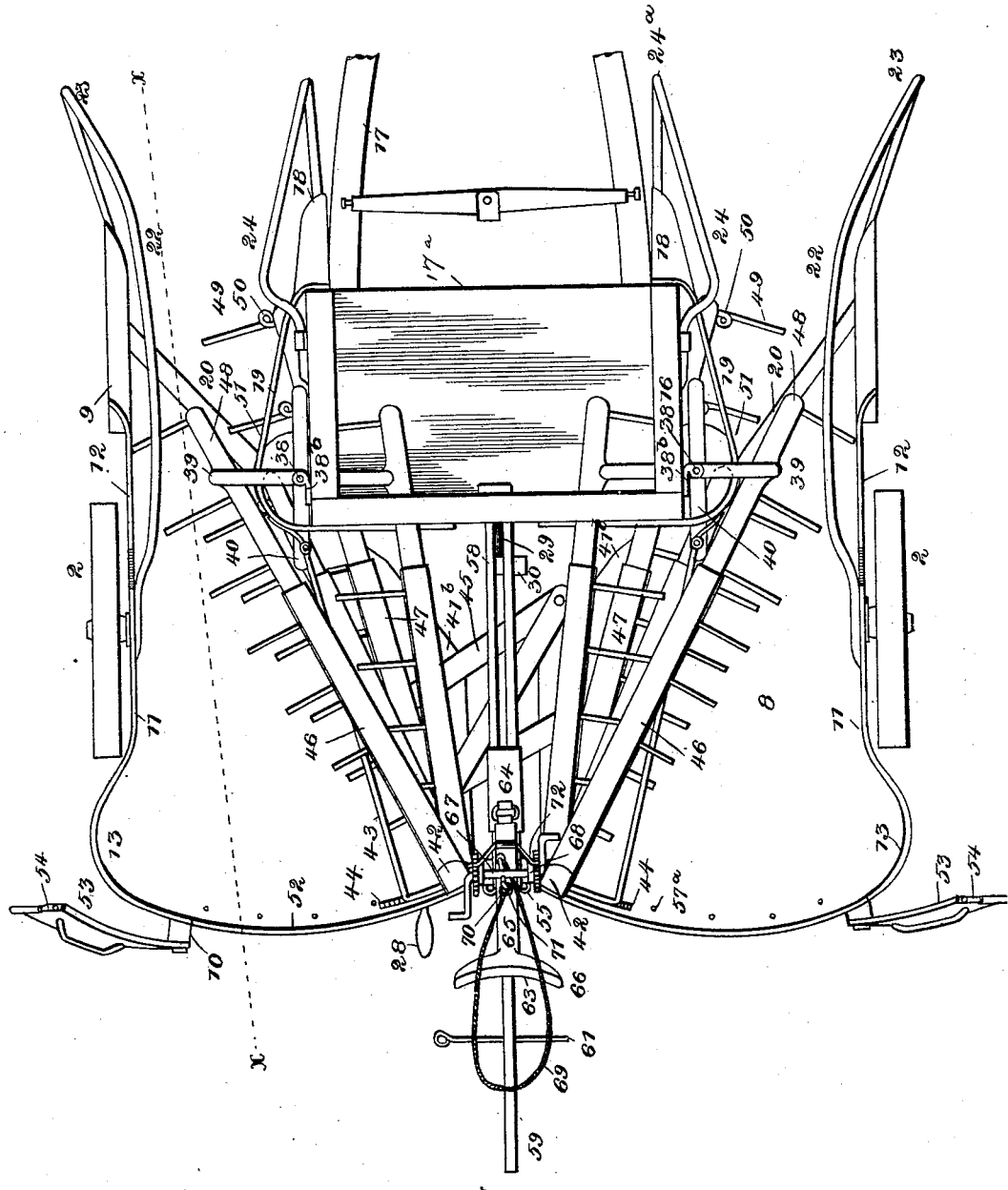
Witnesses
Inventor
Richard B. Robbins
By his Attorney
Franck D. Johns (No Model.) 7 Sheets—Sheet 3.
R. B. ROBBINS.
CORN OR CANE HARVESTER.
No. 475,418. Patented May 24, 1892.
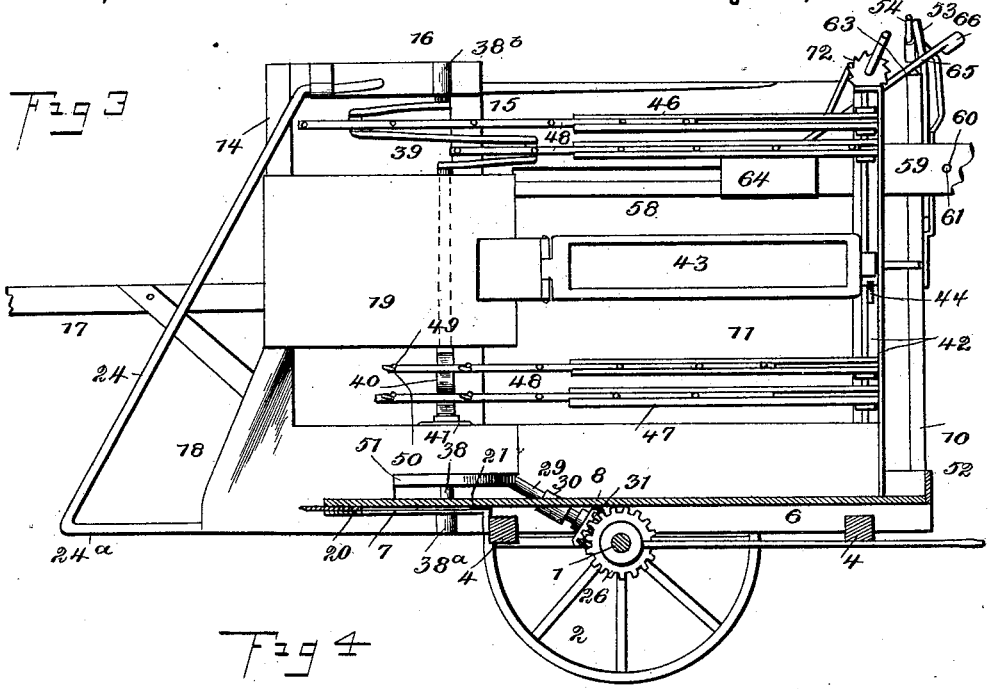
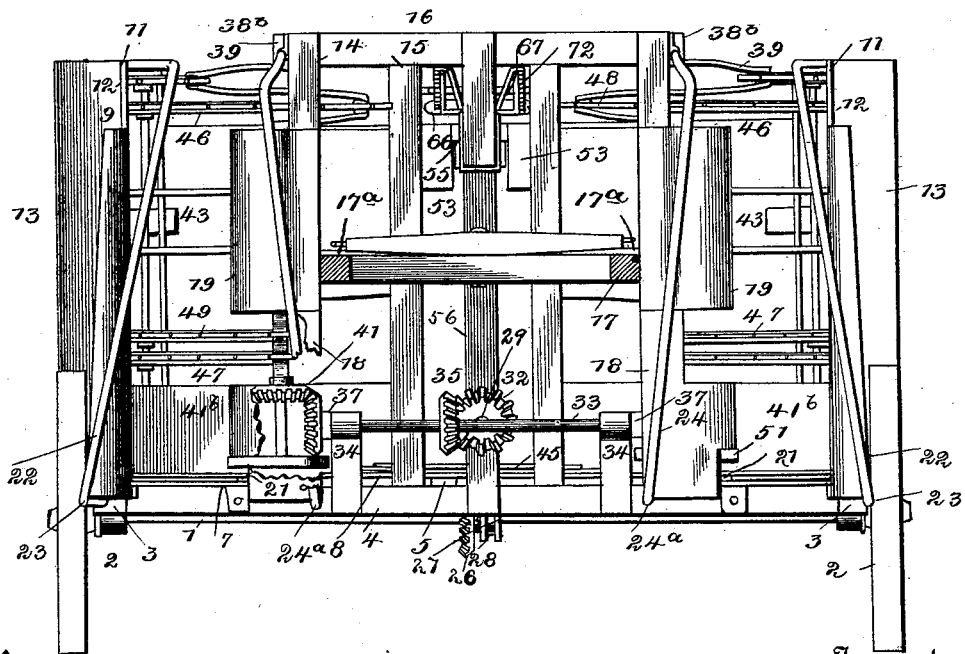
Witnesses
John Imrie
E. T. Barrington
Inventor
Richard B. Robbins
By his Attorney
Franck D. Johns

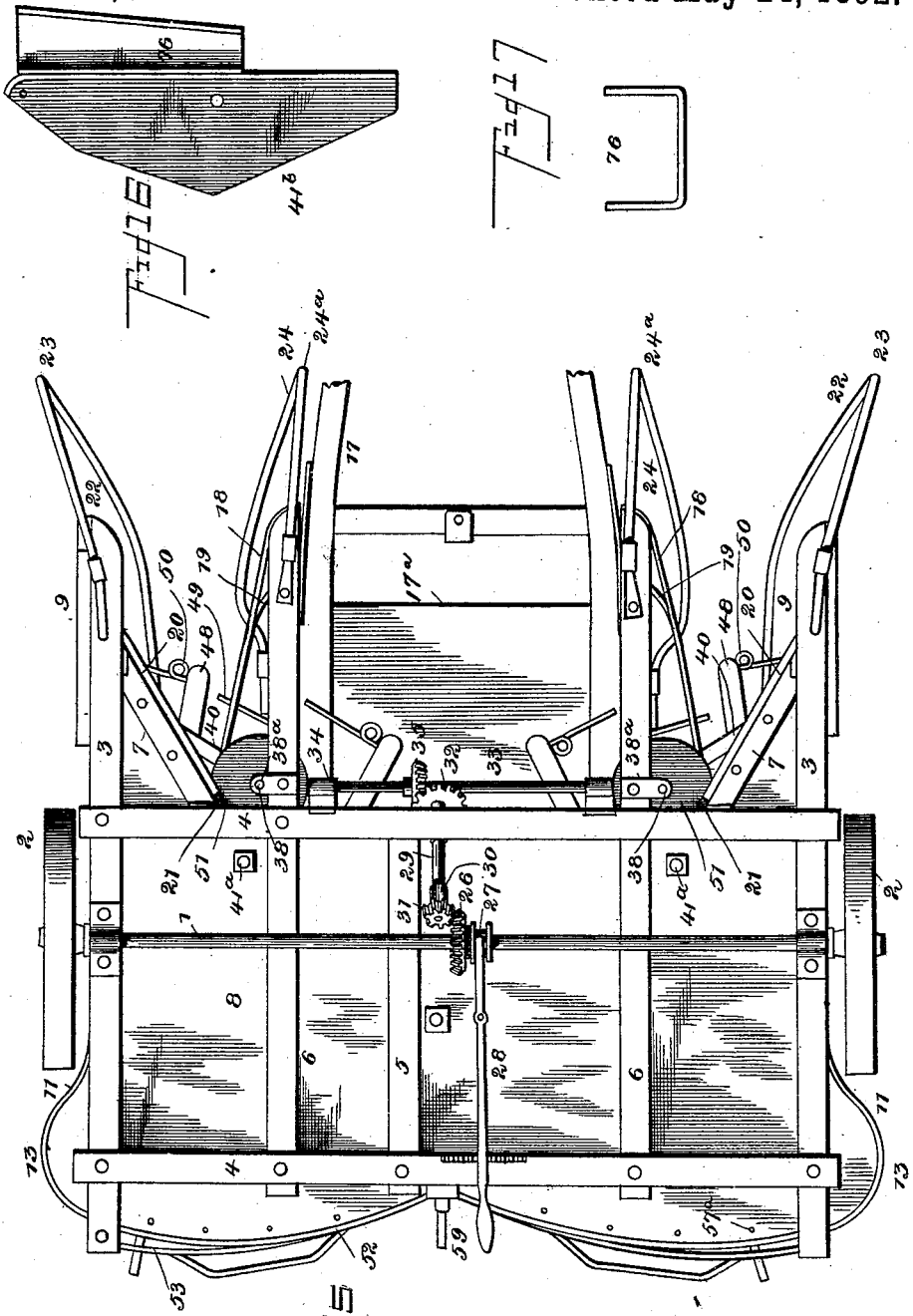

(No Model.) 7 Sheets—Sheet 5.
R. B. ROBBINS.
CORN OR CANE HARVESTER.
No. 475,418. Patented May 24, 1892.
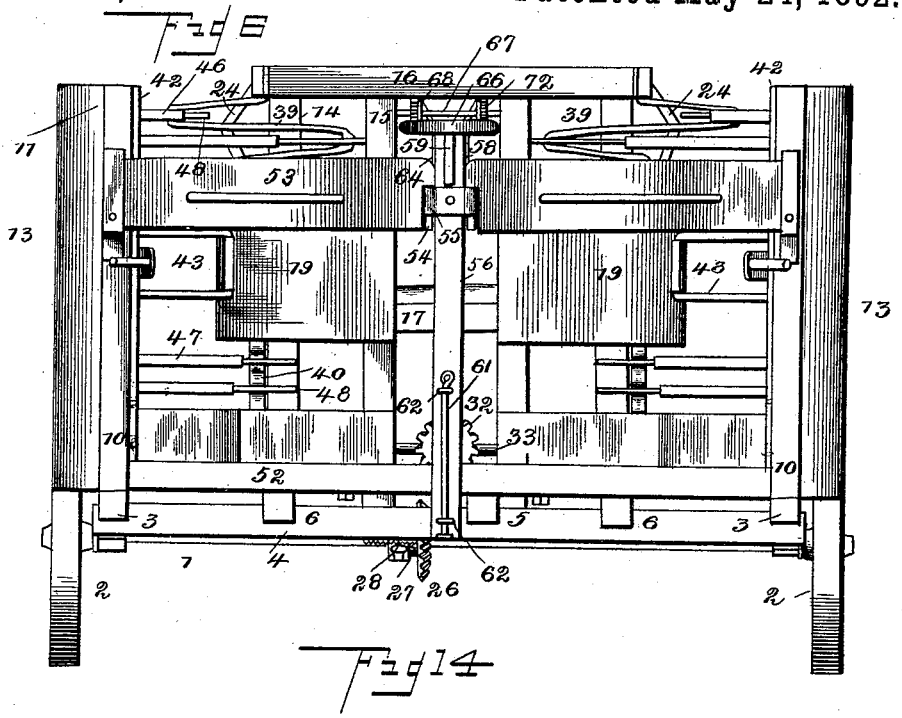
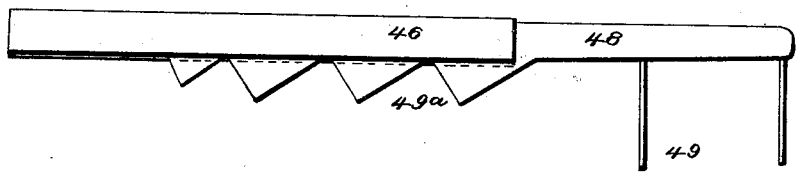
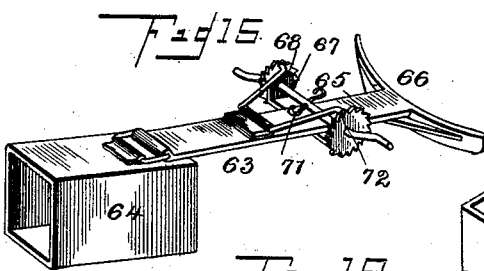
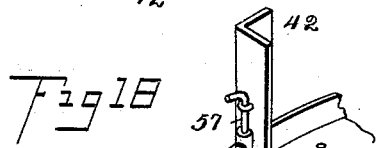
Witnesses
John Innie
E. T. Barrington
Inventor
Richard B. Robbins
By his Attorney
Franck D. Johns (No Model.) 7 Sheets—Sheet 6.
R. B. ROBBINS.
CORN OR CANE HARVESTER.
No. 475,418. Patented May 24, 1892.
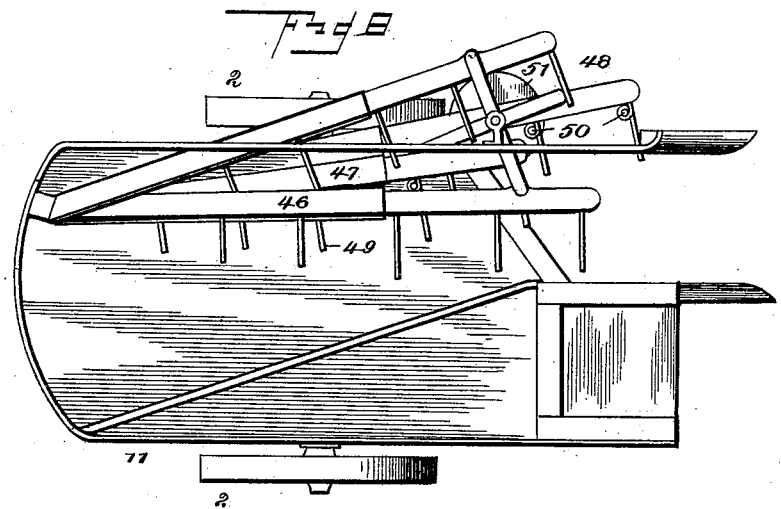
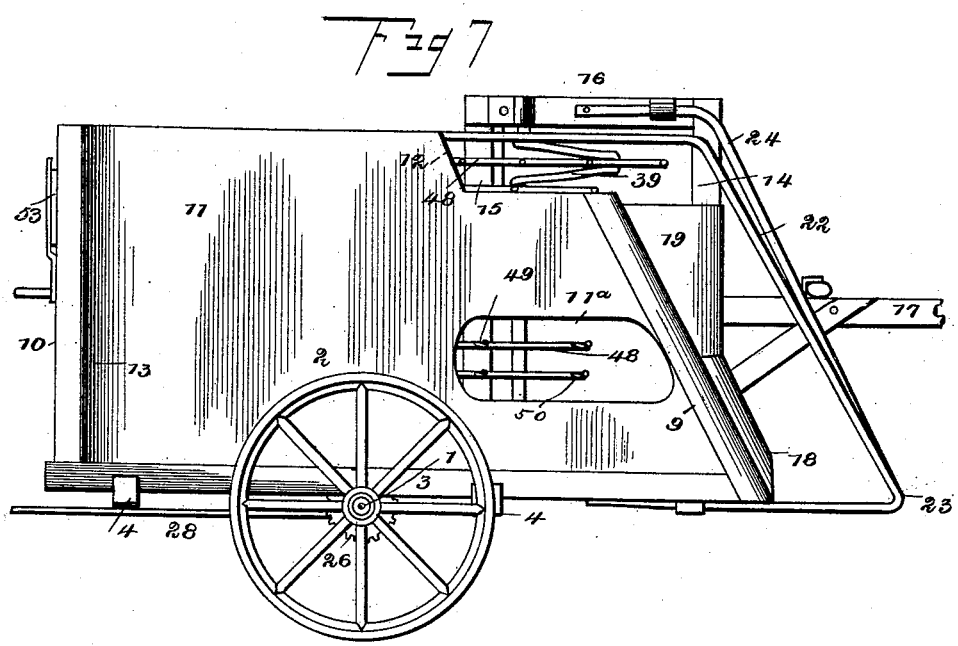

(No Model.) 7 Sheets—Sheet 7.
R. B. ROBBINS.
CORN OR CANE HARVESTER.
No. 475,418. Patented May 24, 1892.
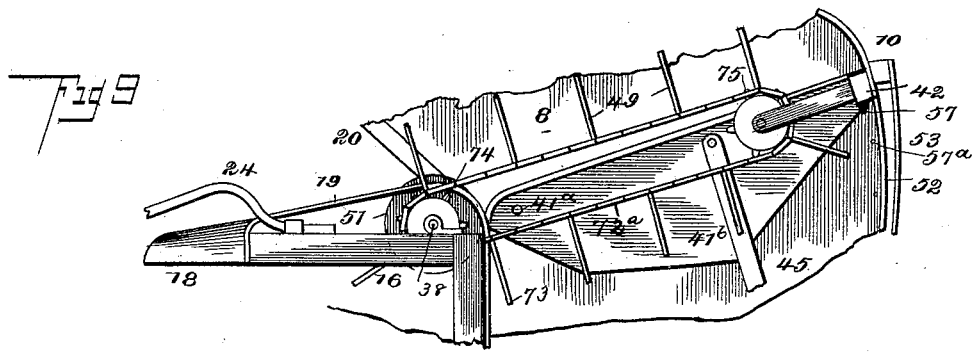
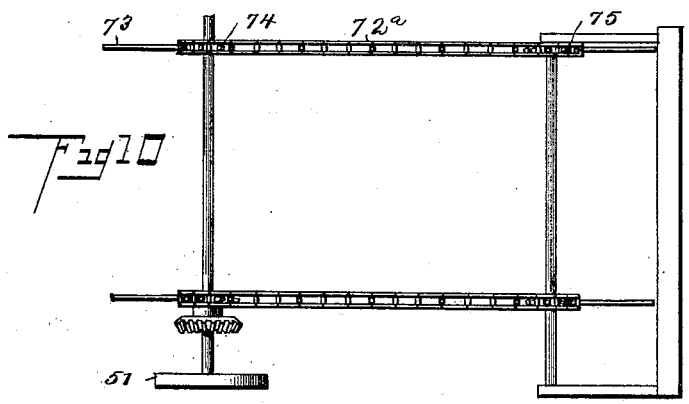
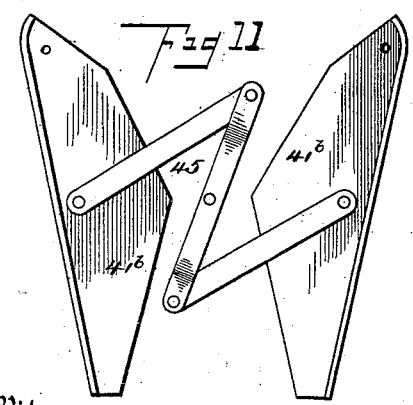
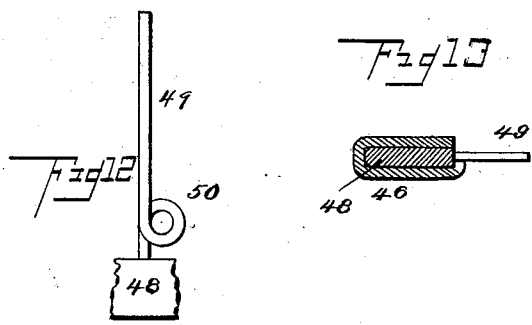
Witnesses
John Janvier
Eugene T. Barrington
Inventor
Richard B. Robbins
By his Attorney
Franck D. Johns

UNITED STATES PATENT OFFICE.

RICHARD B. ROBBINS, OF ADRIAN, MICHIGAN.

CORN OR CANE HARVESTER.

SPECIFICATION forming part of Letters Patent No. 475,418, dated May 24, 1892.

Application filed April 22, 1891. Serial No. 390,003. (No model.)

*To all whom it may concern:*

Be it known that I, RICHARD B. ROBBINS, a citizen of the United States, residing at Adrian, in the county of Lenawee and State of Michigan, have invented certain new and useful Improvements in Corn or Cane Harvesters; and I do hereby declare the following to be a full, clear, and exact description of the invention, such as will enable others skilled in the art to which it appertains to make and use the same.

This invention relates to certain improvements in corn or cane harvesters, and more particularly to that class of harvesters which are known as "cutters."

The invention consists generally of a suitable frame mounted upon wheels and carrying cutters and gathering-arms provided with projecting fingers adapted to engage the stalks, force them against the cutters, and then carry said stalks in an upright position to receptacles for the same arranged at the rear of the machine, said gathering-arms being mounted in swinging frames suitably pivoted at their forward ends and forming one side of the stalk-receptacles, and so arranged that they will act as compressors to compress the stalks in a compact mass in the receptacles, and will also move automatically to increase the size of the receptacles as the stalks accumulate. Said swinging frames are also arranged so as to permit the same to be operated by hand and are provided with locking devices for securing them in any desired position.

The invention further consists in providing the rear of the receptacles with gates which may be opened to permit the removal of the stalks, and a shocking attachment consisting of an adjustable "horse" and compressing device mounted on the frame of the machine; and said invention further consists in certain novelty in the construction, arrangement, and combination of the various parts of the same, all of which I will now proceed to point out and describe, reference being had to the accompanying drawings, in which—

Figure 1 represents a top plan view of a machine embodying my invention, showing adjustable frames and gathering-arms in position to commence operation; Fig. 2, a similar view showing the adjustable frames and gathering-arms in the position they assume when a sufficient quantity of stalks have been accumulated to form a shock, the shocking device being shown in an operative position. Fig. 3 is a vertical section on the line *x x* of Fig. 2; Fig. 4, a front elevation of the machine partially broken away; Fig. 5, a bottom plan view; Fig. 6, a rear elevation; Fig. 7, a side elevation; Fig. 8, a plan view of a modification in which the adjustable frames and gathering devices are located on the outside of the frame. Fig. 9 is a plan illustrating further modification of the gathering devices. Fig. 10 is a side elevation of the modification shown in Fig. 9. Fig. 11 is a detail showing the compound lever connecting the lower members of the adjustable frames. Figs. 12 and 13 are details showing the gathering-fingers. Fig. 14 is a plan showing a modification of the gathering arms and fingers. Fig. 15 is a perspective showing a detail of the compressing device used with the horse. Figs. 16 and 17 are details of a modification used in connection with the adjustable frames. Fig. 18 is a detail of the device employed to lock the frames at any desired point, and Fig. 19 a detail of the cutter or knife.

Referring to said drawings, the numeral 1 represents a suitable axle, having rigidly mounted thereon carrying-wheels 2. On the axle is mounted the main frame or bed of the machine, which consists of the side bars 3, the front and rear cross-bars 4, a center bar 5, connecting the cross-bars, and longitudinal bars 6, arranged parallel with the side bars and of the same length as said side bars. Said bars 3 and 6 project beyond the forward cross-bar.

7 are diagonal braces connecting the side bars near their forward ends with the front cross-bar at a point to one side of and between the longitudinal bars 6 and said side bars.

8 is a flooring of wood or metal secured to the main frame and extending out beyond the front cross-bar to the diagonal braces.

9 are rearwardly-inclined supports secured to the forward ends of the side bars and having their inner edges rounded or beveled. 10 are vertical supports secured to the rear ends of said side bars.

11 represents the sides of the machine, secured to the supports 9 and 10. Said sides may be of any suitable material and may be made solid, as shown, or may be formed of slats. When solid, the sides are provided with an opening 11ª at their forward ends to permit the movement of the gathering-fingers hereinafter described; or, instead of the opening, a bulge or swell may be made in the sides. The forward ends of the sides are secured to the inclined supports and their upper forward ends immediately back of said supports are cut away at 12. Toward the rear of the machine said sides are curved outwardly at 13, forming pockets, which, in connection with the pivoted swinging frames and rear gates hereinafter described, form receptacles in which the stalks are accumulated when cut.

14 are vertical supports secured to the forward portion of the longitudinal bars 6 of the frame. 15 are similar supports secured to the front cross-bar. Said supports are connected at their upper ends by a rectangular frame 16. To these supports, and located within the space between the longitudinal bars 6, are secured thills 17. 17ª is a platform supported upon the rear end of the thills 17. If desired, a driver's seat may also be secured to the supports.

18 are lower curved inner shields having their lower edges attached to the side of the bars 6 approximate to the bars 3 and to the supports 14 at their forward ends and to the supports 15 at their rear ends. The forward ends of the shields incline rearwardly and upwardly at about the same angle as the forward ends of the sides 11, and their forward edges on the side approximate to said sides are curved or beveled in a direction opposite to the curve or bevel of the forward ends of said sides. 19 are upper curved shields, also secured to the supports 14 and 15. Said shields 19 do not extend to the top of the supports 14 and 15, and are so arranged that a space is left between the same and the lower shields. The shields and sides are arranged to present an outwardly-flaring opening between the same, within which a row of stalks are gathered, as hereinafter described.

20 are diagonal cutting-knives secured to the diagonal braces 7 and having their cutting-edges inclined rearwardly and inwardly toward the center of the machine, the upper faces of said knives being substantially flush with the floor. If desired, said knives may be formed with reversible cutting-edges 20ª, as shown in Fig. 19. The cutting-knives extend only partially over the diagonal brace, leaving a space 21 between their inner rear ends and the front cross-bar and floor.

22 are outwardly-flaring and downwardly-inclined guides consisting of metal rods secured to the sides of the machine at a point back of the recessed or cut-away portion of said sides. Said sides are preferably curved inward above said cut-away portion and are formed with a point 23 and are secured at their lower rear ends to the ends of the side bars, leaving a space between the guides and the inclined forward ends of the sides.

24 are similarly-constructed, downwardly-inclined, and inwardly-flaring guides, their upper ends being secured to the rectangular frame 16. Said guides are also formed with a point 24ª and their lower rear ends are secured to the ends of the bar 6. The points of the guides are adapted to pass under any stalks that are bent or may have been beaten down from any cause whatsoever, lift the same, and carry said stalks in a substantially upright position to the cutters and gathering-arms.

26 is a bevel-gear loosely mounted upon the axle 1 near its center, said gear being provided with a clutch 27 upon the axle 1 and operated by a lever 28, which extends beyond the rear of the machine. By means of said lever and clutch the machine may be thrown in or out of gear.

29 is a short inclined shaft mounted in suitable bearings 30, secured to the main frame. 31 is a bevel-gear mounted on the lower end of the shaft 29 and engaging with the gear 26. 32 is a similar bevel-gear mounted on the upper end of said shaft 29. 33 is a horizontal shaft mounted in bearings 34, also secured to the main frame.

35 is a bevel-pinion mounted upon the shaft 33 and engaging with the bevel-gear 32.

37 are bevel-gears mounted upon the ends of the shaft 33.

38 are vertical shafts mounted in suitable bearings 38ª on the main frame and bearings 38ᵇ on the upper rectangular frame. Said vertical shafts are provided with upper double cranks 39 and lower double cranks 40. The upper cranks are arranged to operate above the inner upper shields and the lower cranks are arranged to operate in the space between the upper and lower inner shields.

41 are bevel-gears mounted on the vertical shafts 38 and engaging with the gears 37 on the horizontal shaft 33, by means of which said vertical shafts are operated. The gearing above described is located between the inner lower shields, thus preventing the stalks when cut from coming in contact with said gearing.

Pivoted or hinged to the forward portion of the machine, back of the inner guards, are vertical swinging frames adapted to swing on their pivots or hinges and be automatically moved across the floor of the machine or adjusted at any desired point. Said frames form one side of the stalk-receptacles and consist of a lower horizontal member 41ᵇ, pivoted at its forward end to the main frame of the machine by a suitable bolt or pin 41ª, a vertical upright 42, secured to the rear end of the member 41ᵇ, and an upper member 43, pivoted or hinged at its forward end to the rear of the upper inner shields and having on its rear end a catch adapted to engage a rack 44 on the upright, whereby the position of said upper member with relation to the lower member may be changed, for a purpose hereinafter set forth. If desired, however, the rear end of the upper member may be rigidly attached to the upright 42. The lower members of the frames are preferably L-shaped in cross-section, and their forward ends are turned inward to prevent the same from engaging the stalks as they are carried back from the cutters to the receptacles. The frames are connected by a compound lever 45, having its fulcrum at about the center of the main frame and its ends connected with the lower members of the swinging frames, whereby said frames may be moved substantially to or from the sides of the machine.

To the vertical upright of each frame are pivotally secured two upper horizontal guides or ways 46 and two lower horizontal guides or ways 47, said guides or ways thus being arranged in pairs. Mounted in each of said pivoted guides or ways are reciprocating gathering-arms 48, pivotally connected near their forward ends to the cranks of the vertical crank-shaft, one of each pair of gathering-arms being pivoted to the opposite arms of the double cranks before referred to.

49 are gathering-fingers projecting from the gathering-arms toward the sides of the machine. Said fingers are preferably constructed as shown in Figs. 1 and 2; but, if desired, the rear fingers may be constructed as shown in Fig. 14, in which the fingers are substantially composed of a saw-toothed blade 49ª; or the fingers may be of any other suitable construction. The fingers decrease in length from the front to rear, and the forward fingers on the lower reciprocating arms are formed with a spring, such as a loop 50 or other equivalent spring, enabling them to yield when in contact with a very stiff stalk or other obstruction. The forward ends of the upper and lower pairs of gathering-arms when operated move in an arc of a circle in front of the cutters and engage the stalks or force them against said cutters as the machine moves forward, said stalks being raised and fed to the gathering-arms by the guards or guides before referred to. As the stalks are cut they are carried back in an upright position by the fingers to the rear of the machine into the receptacles therefor, the butts of the stalks resting and sliding upon the flooring.

On the lower ends of the vertical crank-shafts are mounted disks 51, said disks being arranged to extend over the opening or space 21, between the inner ends of the diagonal cutters, and are arranged, in practice, about two or three inches above the upper face of said cutters. These disks cover the space 21, and while they prevent any stalks from being caught in the space they permit any leaves, broken pieces of stalk, or other material to escape under the same through the opening or space, and thus prevent the knives from being clogged. While the main function of the disks is as above stated, they will also aid in forcing the butts of the stalks against the knives should any stalks fail to be cut before reaching the inner ends of the cutters. Instead of using the rotatable disks, a simple stationary flat guard or shield may be employed, said guard being secured in any convenient manner to the frame or extending over the space or opening at the inner end of the knives.

52 are outwardly-curved guard-rails extending across the rear of the machine immediately above the flooring and serve to prevent the butts of the stalks from slipping out when the machine is in operation, but which do not extend high enough above the floor to offer any obstruction to the removal of the stalks when desired.

53 are outwardly-curved gates hinged at their outer ends to the upper rear corners of the sides of the machine. The inner ends of said gates are provided with hooks 54, adapted to engage eyes 55, secured to a vertical support 56, located at the center of the rear of the machine. The curved gates and guard-rails at the rear of the machine, together with the sides of said machine and the swinging vertical frames, form the stalk-receptacles. Said gates 53 are normally kept closed, but may be opened when desired to remove the stalks to form a shock. The rear ends of the swinging vertical frames are provided with a stop-pin or latch 57, which engages suitable holes 57ª in the rear of the flooring or main frame, whereby said swinging frames may be adjusted and locked in any desired position.

58 is a horizontal way or guide located at the longitudinal center of the machine, its forward end being secured to the rectangular frame 16 and its rear end to the vertical support 56.

59 is an adjustable bar mounted in said way and adapted to be drawn out at the rear of the machine. Said bar is provided with an aperture 60, in which is adapted to be placed a cross arm or bar 61, thus forming a horse, upon which a shock is built. When the machine is in operation, the cross bar or arm 61 is carried in eyes 62 on the support 56.

63 is an adjustable compressor consisting of a sliding bracket 64, sliding upon the way 58, and to which is pivoted an arm 65, the rear free end of said arm being provided with a curved or segmental cross-bar 66, which may be raised any desired height and rests against the upper portions of the stalks when the horse is in position and the shock being formed.

67 is a windlass or drum mounted in bearings 68 on the pivoted arm 65 and provided with crank-handles on each side, so that the drum may be operated from either side of the machine.

69 is a cord or chain attached to the drum at one end and adapted to be wound around the same, the free end of said cord or chain being provided with a hook or loop 70. The parts thus described form an adjustable compressor which may be adjusted at the desired position on the way and raised to any desired height to accommodate it to stalks of different lengths. When used in shocking, the cord or chain attached to the drum is passed around the upper part of the shock above the horse and the loop or hook hooked to a hook 71 on the drum. Said drum is then revolved, winding the cord around the same, drawing the compressor cross-bar against the stalks on the side of the shock next to the machine and the cord or chain around the opposite side of the shock until it is sufficiently compressed, the pawl and ratchets 72 holding the same in this position until the permanent band is applied. The compressor is then released and both it and the horse drawn back upon the supporting guide or way. The pivoted guides or ways 46 and 47 and the reciprocating gathering-arms 48 may be dispensed with and endless sprocket belts or chains 72ª, provided with gathering-fingers 73, may be used. The endless chains or belts pass over sprocket wheels or pulleys 74 and 75, the forward sprocket wheels or pulleys 74 being mounted on the upper end of the vertical shafts 38, as shown in Fig. 9, whereby the carrier is operated. In this latter construction the cranks on the vertical shafts 38 are dispensed with. The rear sprocket-wheels or pulleys are mounted on the rear ends of the swinging frames.

In Figs. 16 and 17 I show an attachment which may be used in connection, which consists of a way 76, consisting of a substantially rectangular trough attached to the outer sides of the lower members of the frame. Said way is so arranged that the butts of the stalks are received therein as they come from the cutters and are carried back to the receptacles, the length of the said ways determining the distance the stalks are carried back before being released and delivered to said receptacles.

My invention is designed to cut two rows of stalks at a time; but it may be constructed to cut but one row. In the latter case it is desirable to form the stalk-receptacles back of the line of draft, so as to overcome as far as possible the side draft. To accomplish this, I place the swinging frames carrying the gathering-arms 48 on the outer side of the machine, as shown in Fig. 8, in which case the position of the diagonal knife is reversed, all of which is shown in said Fig. 8. The construction thus described may be used with a machine adapted to cut two rows at the same time. The height above the ground at which the stalks are cut may be regulated by the diameter of the carrying-wheels.

Any other desired form of cutter other than the diagonal knives heretofore described may be employed.

The operation of my invention is as follows: As before stated, the machine is especially adapted to cut two rows of stalks at the same time, the animal drawing the machine passing between the rows. The forward and downwardly-projecting guards or guides raise any stalks that may be inclined or beaten down and carry them to the cutters. The forward gathering-fingers force said stalks against the cutters, said cutters in the construction shown being arranged to present a diagonal cutting-edge to the row of stalks and have a shearing cut. Any leaves, parts of stalks, or other material fall through the opening or space left between the inner ends of the knives and frame of the machine, thus preventing the knives from becoming clogged. The rotating disks or guard plates above said space or opening prevent the butts of any cut stalks from falling through said space. As the stalks are cut they are carried back in a substantially upright position to the receptacles at the rear of the frame by means of the projecting fingers on the upper and lower pairs of reciprocating arms. When the machine starts to cut the stalks, the pivoted swinging frames upon which the reciprocating gathering-arms are mounted are in the position shown in Fig. 1. As the stalks accumulate, the said swinging frames, forming one side of the receptacles, compress the stalks in a compact mass in said receptacles, and as the stalks accumulate said swinging frames are automatically moved toward the center of the frame, thus gradually increasing the size of the receptacles. If desired, the frames may be moved by the operator, who may also retard their inward movement, so as to more thoroughly compress the stalks or may force them against said stalks for the same purpose. These swinging frames or sides may also be locked at any desired point by means of the pin or latch described. When needed, the upper hinged or pivoted member of said frames may also be moved out toward the sides of the machine to aid in compressing the stalks and also to prevent the rear gathering-fingers from engaging said stalks when any number may have accumulated. When a sufficient quantity of stalks have accumulated, the machine is stopped, the horse is adjusted as before described, the rear gates are then opened, the stalks are removed from each of the receptacles, and a quarter-section of a shock formed on each side of the horizontal adjustable bar and cross-bar of the horse, the butts of the stalks resting upon the ground. The compressor is then brought into operation in the manner heretofore described. When the permanent band has been applied, the cross-bar of the horse is removed and replaced upon the machine, the compressor is detached, and as the machine is started the horizontal adjustable bar is drawn from the shock and then both it and the compressor returned to their normal position on the central longitudinal way or guide. The rear gates are then closed, the machine started, and the operation repeated. The operator in using my machine walks behind the same. By means of the connection between the swinging frames both of said frames or sides may be operated by one person.

It is obvious that numerous changes and modifications may be made in the construction and arrangement of the various parts of my said invention without departing from the spirit and principle of the same, and I do not wish to be understood as limiting myself to the specific construction herein shown and described; but

What I claim as new, and desire to secure by Letters Patent, is—

1. In a corn or cane harvester, a main frame, a cutter secured to the forward end of the frame, a stalk-receptacle located on said frame and having a stationary side, and an adjustable side consisting of a pivoted or hinged frame adapted to compress the stalks within the receptacle and to be moved to enlarge the receptacle as the stalks accumulate, substantially as shown and described.

2. In a corn or cane harvester, a main frame, a cutter secured to the forward end of the frame, a stalk-receptacle located on the main frame and having a stationary side, and an automatically-adjustable side consisting of a pivoted or hinged frame adapted to compress the stalks within the receptacle and to be automatically moved by said stalks as they accumulate to enlarge the receptacle, substantially as shown and described.

3. In a corn or cane harvester, a main frame, a cutter secured to the forward end of the frame, a stalk-receptacle located on the main frame and having a laterally-adjustable side consisting of a pivoted or hinged frame, and means for locking said side at any desired point of adjustment, all constructed, arranged, and operating substantially as shown and described.

4. In a corn or cane harvester, a main frame, a cutter secured to the forward end of the frame, a stalk-receptacle located on the main frame and having a stationary side, an adjustable side consisting of a pivoted or hinged frame, and gathering mechanism or conveyers adapted to carry the stalks from the cutter to the receptacle, all constructed, arranged, and operating substantially as shown and described.

5. In a corn or cane harvester, a main frame, a cutter secured to the forward end of the main frame, a stalk-receptacle having a stationary side, an adjustable side consisting of a pivoted or hinged frame, and gathering and conveying mechanism adapted to engage the stalks, force the same against the cutter, and carry said stalks to the receptacle when cut, substantially as shown and described.

6. In a corn or cane harvester, a main frame, a cutter secured to the forward end of the main frame, a stalk-receptacle having an adjustable side, and gathering mechanism mounted on said adjustable side and adapted to engage the stalks, force the same against the cutter, and carry said stalks to the receptacle when cut, substantially as shown and described.

7. In a corn or cane harvester, a main frame, a cutter located at the forward end of the frame, a stalk-receptacle located on the frame, having a laterally-adjustable side consisting of a pivoted or hinged frame, and rear gates adapted to be opened to permit the removal of the stalks when a sufficient quantity has accumulated, substantially as shown and described.

8. In a corn or cane harvester, the combination, with a main frame, and a cutter located at the forward end of the frame, of a stalk-receptacle located on the frame and having an adjustable side pivoted at its forward end to the main frame, a vertical shaft mounted in bearings at the forward portion of the frame, means for operating said shaft, said shaft having upper and lower double cranks, upper and lower pairs of guides or ways pivoted at their rear ends to the rear ends of the pivoted adjustable side, and reciprocating gathering-arms mounted in said guides and pivotally connected to the double cranks of the vertical shaft and having gathering-fingers projecting from said gathering-arms and adapted to engage the stalks, force them against the cutters, and carry said stalks to the receptacles when cut, substantially as shown and described.

9. In a corn or cane harvester, a main frame, a cutter secured to the forward end of the frame, a stalk-receptacle formed on the frame and having a laterally-adjustable side provided with a laterally-adjustable member adapted to compress the stalks, and gathering mechanism or conveyers adapted to carry the stalks from the cutters to the receptacle, all constructed, arranged, and operating substantially as shown and described.

10. In a corn or cane harvester, the combination of a main frame, a cutter secured to the forward end of the frame, a stalk-receptacle formed on said frame and having an adjustable side, provided with an upper adjustable member pivoted at its forward end and having a catch at its rear end adapted to engage a rack on the rear of the adjustable side, gathering mechanism adapted to engage the stalks and carry the same to the receptacle, and means for operating said gathering mechanism, all constructed, arranged, and operating substantially as shown and described, whereby the adjustable side may be moved to enlarge the receptacle as the stalks accumulate, compress said stalks in the receptacle, and the adjustable upper member of said side may be moved to further aid in the compression of the stalks.

11. In a corn or cane harvester, the combination of a main frame, cutters secured at the forward end of and on each side of the center of the frame, stalk-receptacles formed on said frame on each side of its center and having adjustable sides connected by a compound lever, whereby they may be moved simultaneously, and gathering mechanism or conveyers adapted to carry the stalks from the cutters to the receptacles, all constructed, arranged, and operating substantially as shown and described.

12. In a corn or cane harvester, the combination of a main frame, a cutter secured to the forward end of the frame, a stalk-receptacle formed on the frame, having a laterally-adjustable side, and a stationary side having a downwardly-inclined beveled forward end projecting in front of and on one side of the cutter, shields secured to the frame on the opposite side of the cutter from the stationary side, gathering mechanism adapted to carry the stalks from the cutter to the receptacles, and means for operating said gathering mechanism, substantially as shown and described.

13. In a corn or cane harvester, the combination, with a main frame, a support projecting from said frame, and a diagonal cutter secured to said support so as to leave a space or opening between the rear end of the cutter and the front of said main frame, of a plate or disk located above and covering said space or opening, substantially as shown and described, for the purpose specified.

14. In a corn or cane harvester, the combination, with a main frame, a support projecting from said frame, and a diagonal cutter secured to said support so as to leave a space or opening between the rear end of the cutter and the front of said main frame, of a pivoted plate or disk located above and covering said space or opening, substantially as shown and described, for the purpose specified.

15. In a corn or cane harvester, the combination of a main frame having stalk-receptacles located thereon, a longitudinal way or guide formed upon said frame, and an adjustable bar mounted in said way, having a cross-bar and adapted to be withdrawn at the rear of the machine to form a horse upon which to form the shocks, substantially as shown and described.

16. In a corn or cane harvester, the combination of a main frame having stalk-receptacles thereon, a longitudinal way or guide on said frame, and an adjustable bar mounted on said way and adapted to be withdrawn at the rear of the machine and provided with a cross-arm forming, in connection with the adjustable bar, a horse for shocking the stalks, all constructed, arranged, and operated substantially as shown and described.

17. In a corn or cane harvester, the combination of a main frame having stalk-receptacles thereon, a longitudinal way or guide on said frame, an adjustable bar mounted on said way and having a cross-arm forming with said frame a horse for shocking the stalks, and an adjustable compressor for compressing said stalks, all constructed, arranged, and operating substantially as shown and described.

18. In a corn or cane harvester, the combination of a main frame, an adjustable horse, a compressing device comprising a sliding bracket mounted upon a suitable way, an arm pivoted to said bracket and carrying a shaft having a crank-handle, a cord or chain attached to said shaft and adapted to surround the shock of corn, and a compressing cross-arm attached to the outer end of the pivoted arm, said cross-arm being adapted to co-operate with the cord or chain to compress the stalks, all constructed, arranged, and operating substantially as shown and described.

19. In a corn or cane harvester, the combination, with a main frame having stalk-receptacles located thereon, of an adjustable bar mounted on said frame and adapted to be withdrawn rearwardly, so as to project beyond the rear of the machine to form a horse upon which to form shocks, substantially as shown and described.

20. A corn or cane harvester having a main frame, stalk-receptacles located thereon, and a bar secured to said frame and projecting from the rear of the machine to form a horse upon which the shocks are formed, substantially as shown and described.

In testimony whereof I affix my signature in presence of two witnesses.

RICHARD B. ROBBINS.

Witnesses:
A. E. BARAGAR,
JOHN GAHAGAN.